Patented Mar. 10, 1942

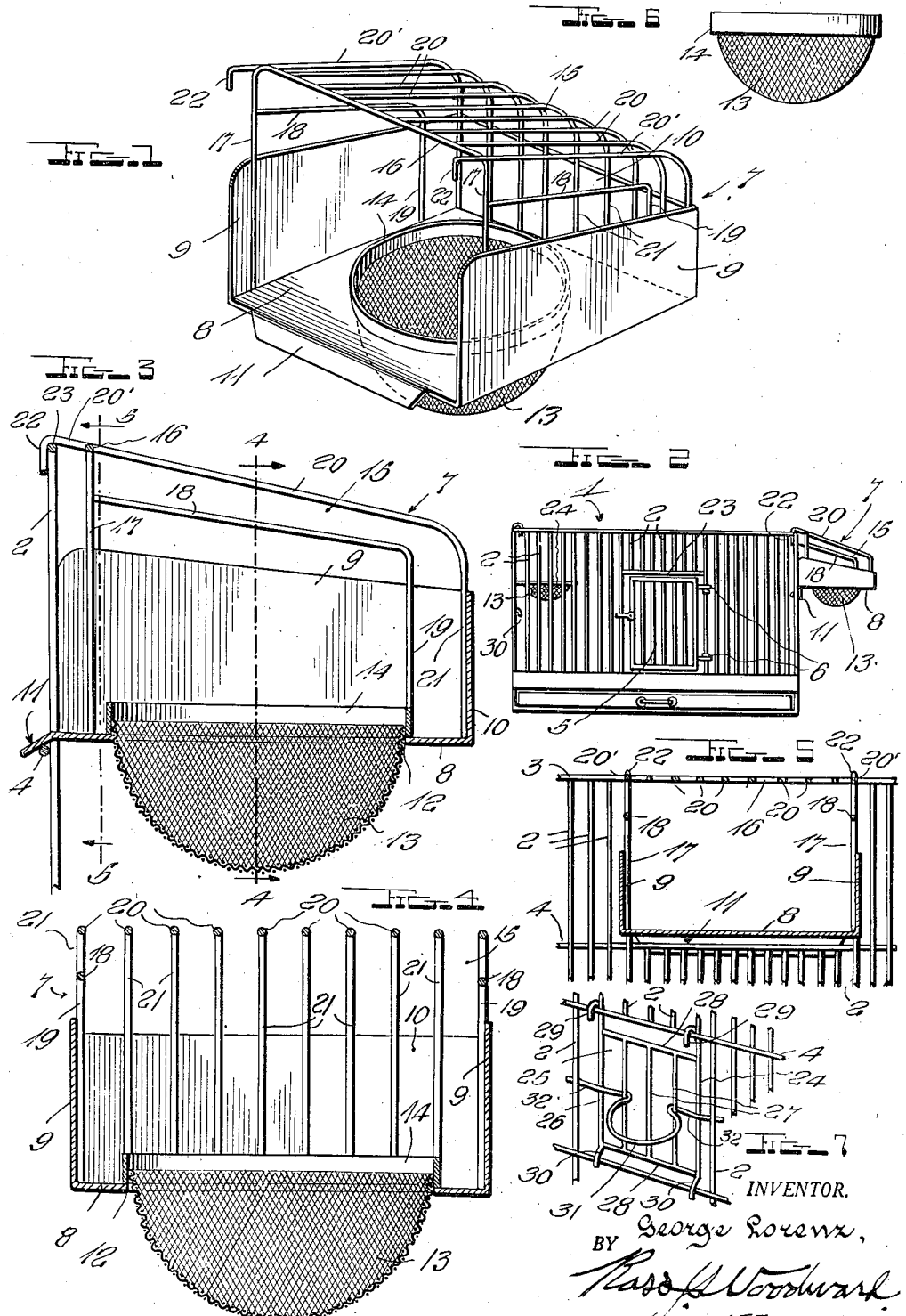

2,275,914

UNITED STATES PATENT OFFICE 2,275,914

BIRD NEST HOLDER

George Lorenz, Yonkers, N. Y.

Application January 11, 1941, Serial No. 374,123

1 Claim. (Cl. 119—45)

This invention relates to a bird nest holder and it is one object of the invention to provide a device of this character which may be easily applied to a cage used as a breeding cage for canaries and other birds, the holder being so constructed that while it may be easily applied it will be firmly held in place and prevented from accidentally slipping out of engagement with the cage.

Another object of the invention is to so mount the nest holder that while it will be firmly held in place when applied to a cage, it may be easily removed when cleaning is necessary.

Another object of the invention is to provide a nest holder which may be disposed externally of a cage, thus permitting it to be applied or removed without reaching into the cage and frightening the birds in the cage.

Another object of the invention is to so form the holder that a cup of fine wire mesh may be removably mounted through the bottom of the holder and this cup readily removed during a cleaning operation.

Another object of the invention is to provide a nest holder formed of sheet metal and wire, thus producing a holder which may be cheaply manufactured and one which is at the same time strong and durable.

The invention is illustrated in the accompanying drawing, wherein:

Fig. 1 is a perspective view of a nest holder of the improved type.

Fig. 2 is a view in elevation showing nest holders applied to a cage.

Fig. 3 is a sectional view taken vertically through a nest holder and showing the same applied to a wall of a cage.

Fig. 4 is a vertical sectional view taken at right angles to Fig. 3 on the line 4—4 thereof.

Fig. 5 is a sectional view on the line 5—5 of Fig. 3.

Fig. 6 is a side elevation of the cup.

Fig. 7 is a fragmentary perspective view showing a modified form of nest holder mounted within the cage.

There is illustrated a cage I of the type known as breeding cages and this cage may be of any desired dimensions. The walls of the cage are each formed of vertically extending wire strands 2 having their upper ends welded to a bordering strand or frame 3, the strands being braced by a horizontally extending strand 4, it being understood that two or more bracing strands 4 may be provided, as shown in Fig. 7, if desired. This is conventional construction and forms no part of the invention. The cage is also provided with the usual door 5 which is hinged, as shown at 6, in order that it may be opened and access had to the interior of the cage. At nesting time, the birds are confined in the breeding cages having nests therein and, if the nests are located within a small cage and a person reaches into the cage to clean a nest, the birds often become frightened and fail to return to the nest after it has been cleaned. For this reason, the improved nest holder, indicated in general by the numeral 3, is mounted externally of the cage and is removably applied to a wall thereof so that it can be removed and cleaned and then replaced without thrusting a hand and arm into the cage through the doorway and frightening the birds.

This nest holder has a bottom 8 which is formed of sheet metal and has marginal portions turned upwardly and secured to each other to form side walls 9 and an outer end wall 10, the side walls gradually increasing in height toward their front ends. At its front end, the bottom 8 is formed with a lip or tongue which is bent downwardly to form a diagonally extending abutment flange 11 for extending inwardly through a wall of the cage to which the nest holder is applied. The lip serves as a shield to prevent dirt or droppings from falling through the space between the cage and the bottom of the nest holder. The central portion of the bottom is cut out to form an opening 12 in which a cup 13 is removably fitted. This cup, in which the nest is to be built, is formed of wire mesh and about its periphery or upper edge is welded a metal band or collar 14 which rests on the bottom 8 about the opening 12 and very effectively supports the cup, as shown in Figs. 1, 2 and 3. The walls serve very effectively to shield a bird sitting on the nest from drafts and also serve to prevent the bird from being frightened by persons approaching the cage.

In order to prevent a bird in the nest holder from flying off the nest or otherwise leaving the nest holder except through the open front end thereof which registers with an opening in the wall of the cage, there has been provided an upper portion 15 consisting of a lattice work frame formed from metal strands. At its front end the frame has a yoke 16, the arms 17 of which are welded against inner faces of the side walls 9. Strands 18 are welded at their front ends to the arms 17 and these strands extend longitudinally of the side walls 9 in vertical spaced relation thereto with their rear portions bent downwardly to provide struts 19 which are welded to the side walls. The yoke 16 and the bars 18 form a frame to the bridge of which front ends of the strands 20 are welded. These strands form a top for the frame and rear portions 21 of the strands are bent downwardly and welded to the inner face of the rear wall 10. The strands 20' at opposite sides of the top project forwardly from the yoke at upper ends of the side bars 17 thereof and have their front ends bent downwardly to form hooks 22 for engaging over the upper bordering strand or frame 23 of the cage and suspending the nest holder against the outer face of the side wall of the cage in enclosing relation to an opening in the wall. This opening is formed by cutting out portions of the vertical strands forming side walls of the cage, the opening being of such depth that the flange 11 at the front end of the bottom of the nest holder will extend through the opening and rest upon its lower edge. If desired, the nest holder may be applied to the cage wall in which the doorway is formed by first opening the door 5 and then suspending the nest holder from the bar 23 which extends across the upper end of the doorway.

Instead of forming the nest holder as illustrated in Figs. 1 through 5, it may be formed as shown in Fig. 7. This nest holder is to be mounted within the cage, as shown at the left of Fig. 2, and this embodiment of the invention is indicated in general by the numeral 24. This nest holder has a frame 25 formed of metal strands 26, 27 and 28, the strands 26 being of greater length than strands 27 and having their upper and lower ends projecting from the strands or end bars of the frame. Upper ends of the side strands 26 are bent to form hooks 29 for engaging about the bar 4 and their lower ends are bent to form fingers 30 for bracing the lower end of the frame.

A yoke or hoop 31 for carrying the cup 13 is associated with the frame and is formed from a strand of resilient wire. This yoke is open at its front in order that it may expand and contract and end portions of the strand from which it is formed are bent to form arms 32 which are interwoven with the strands 26 and 27 and are of such length that their end portions project transversely from opposite sides of the frame 25 for engagement with strands 2 at opposite sides of an opening formed in the cage wall or at opposite sides of the doorway of the cage.

Having thus described the invention, what is claimed as new is:

A bird nest holder comprising a body formed from sheet material and including a bottom and solid side walls and a solid end wall rising from edges of the bottom, the bottom being formed with an opening, a cup fitted downwardly through the opening and having an outstanding collar about its upper end for resting on the bottom about the opening therein and supporting the nest through the opening, a frame over the body having a forward yoke of inverted U-shape extending transversely of the frame with its arms secured to the side walls of the body, bracing rods extending rearwardly from the arms of said yoke with their rear portions bent downwardly, and secured against the side walls of the body, strands spaced transversely from each other and bent to form a top wall and rear wall for the frame, said strands having their front ends secured to the bridge of the yoke and their downwardly extending rear portions secured against the rear wall of the body, certain of said strands having their front end portions projecting forwardly from the yoke and bent to form hooks for engaging portions of a cage wall and detachably mounting the nest holder against the cage wall in enclosing relation to an opening therein, and a tongue along the front edge of the bottom sloping downwardly and forwardly for extending through an opening in the cage wall and resting upon the lower edge of the opening.

GEORGE LORENZ.